United States Patent
Sato et al.

(10) Patent No.: US 9,144,869 B2
(45) Date of Patent: Sep. 29, 2015

(54) MACHINE MOTION TRAJECTORY MEASURING DEVICE, NUMERICALLY CONTROLLED MACHINE TOOL, AND MACHINE MOTION TRAJECTORY MEASURING METHOD

(75) Inventors: Ryuta Sato, Tokyo (JP); Kotaro Nagaoka, Tokyo (JP); Tomonori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 419 days.

(21) Appl. No.: 13/133,770

(22) PCT Filed: Sep. 10, 2009

(86) PCT No.: PCT/JP2009/065859
§ 371 (c)(1),
(2), (4) Date: Jun. 9, 2011

(87) PCT Pub. No.: WO2010/067651
PCT Pub. Date: Jun. 17, 2010

(65) Prior Publication Data
US 2011/0246132 A1 Oct. 6, 2011

(30) Foreign Application Priority Data
Dec. 9, 2008 (JP) ................... 2008-313492

(51) Int. Cl.
*B23Q 5/40* (2006.01)
*B23Q 5/28* (2006.01)
(Continued)

(52) U.S. Cl.
CPC .. *B23Q 5/40* (2013.01); *B23Q 5/28* (2013.01); *B23Q 17/22* (2013.01); *G05B 19/19* (2013.01); *G05B 2219/41233* (2013.01); *G05B 2219/43072* (2013.01)

(58) Field of Classification Search
CPC ............ B23Q 5/28; B23Q 5/40; B23Q 17/22; G05B 19/19; G05B 2219/43072; G05B 2219/41233

USPC ........... 702/150–153; 700/69; 318/58, 61, 64, 318/90, 259, 260, 262, 263, 270, 271, 274, 318/651

See application file for complete search history.

(56) References Cited

U.S. PATENT DOCUMENTS 6,058,342 A * 5/2000 Orbach et al. ................ 701/50
7,368,887 B2 * 5/2008 Iwashita et al. ............ 318/576
(Continued)

FOREIGN PATENT DOCUMENTS

CN 1821909 A 8/2006
CN 101206470 A 6/2008
(Continued)

OTHER PUBLICATIONS

Bernard Favre-Bulle, "Robot Motion Trajectory-Measurement with Linear Inertial Sensors", 2005, pp. 115-132, http://cdn.intechopen.com/pdfs/8/InTech-Robot_motion_trajectory_measurement_with_linear_inertial_sensors.pdf.*

(Continued)

*Primary Examiner* — Alexander Satanovsky
(74) *Attorney, Agent, or Firm* — Oblon, McClelland, Maier & Neustadt, L.L.P.

(57) ABSTRACT

A machine motion trajectory measuring device for measuring the motion trajectory of a machine used in an apparatus which controls the position of the machine by feeding back a detected position obtained by converting the rotation angles of motors for a plurality of movable axes and then driving the motors such that the detected position follows a commanded position is provided. The machine motion trajectory measuring device includes accelerometers for measuring the acceleration of the machine; and a motion trajectory measuring unit that measures the motion trajectory of the machine by obtaining the position of the machine by integrating the acceleration twice and correcting the position of the machine such that the profile of the position of the machine coincides with the profile of the detected position or the profile of an estimated position estimated using a model for simulating the response of the position of the machine to the commanded position.

17 Claims, 10 Drawing Sheets

(51) Int. Cl.
*B23Q 17/22* (2006.01)
*G05B 19/19* (2006.01)

(56) References Cited

U.S. PATENT DOCUMENTS

| | | | |
|---|---|---|---|
| 7,571,669 B2* | 8/2009 | Eba | 82/118 |
| 8,165,843 B2* | 4/2012 | Kimura | 702/150 |
| 8,290,681 B2* | 10/2012 | Kaminsky et al. | 701/99 |
| 2002/0068990 A1 | 6/2002 | Yamazaki et al. | |
| 2006/0186849 A1 | 8/2006 | Iwashita et al. | |
| 2007/0046677 A1* | 3/2007 | Hong et al. | 345/442 |
| 2007/0052383 A1 | 3/2007 | Abe et al. | |
| 2008/0141836 A1 | 6/2008 | Eba | |

FOREIGN PATENT DOCUMENTS

| | | |
|---|---|---|
| DE | 602006000541 T2 | 3/2009 |
| EP | 1 762 917 A1 | 3/2007 |
| JP | 61 7907 | 1/1986 |
| JP | 61 209857 | 9/1986 |
| JP | 63 133212 | 6/1988 |
| JP | 4 177408 | 6/1992 |
| JP | 2002 175105 | 6/2002 |
| JP | 3858062 | 12/2006 |
| JP | 2007 72879 | 3/2007 |
| TW | 200829890 A | 7/2008 |

OTHER PUBLICATIONS

Office Action and Search Report issued on Jan. 3, 2013, in Taiwanese Patent Application No. 098141667 with partial English translation.
Kakino, Y. et al., "Measurement of Motion Accuracy and Improvement of Machining Accuracy on Ultra-High Precision NC Machine Tools by Using Cross Grid Encoder Test", The Japan Society for Precision Engineering, vol. 62, No. 11, pp. 1612-1616, (1996).
International Search Report Issued Dec. 22, 2009 in PCT/JP09/065859 filed Sep. 10, 2009.
Office Action issued on Nov. 20, 2013 in the corresponding German Patent Application No. 11 2009 003 699.6 (with English Translation).
Combined Chinese Office Action and Search Report issued on Nov. 22, 2013 in Patent Application No. 200980149230.1 (with partial English language translation).
Corrected Office Action issued Dec. 17, 2013 in German Patent Application No. 11 2009 003 699.6 with English translation.

* cited by examiner

MACHINE MOTION TRAJECTORY MEASURING DEVICE, NUMERICALLY CONTROLLED MACHINE TOOL, AND MACHINE MOTION TRAJECTORY MEASURING METHOD

FIELD

The present invention relates to a machine motion trajectory measuring device and particularly to a device for measuring a machine motion trajectory in a numerically controlled machine tool or robot.

BACKGROUND

In a numerically controlled machine tool or robot, motors are driven to achieve machine motion along a plurality of movable axes so that the machine position is controlled to a commanded position as precisely as possible. In this case, an error may occur between the commanded position and the actual machine position because of the influence of machine vibrations and frictional force during reversal of the direction of motion. Therefore, the surface being machined, for example, may be damaged. If such a problem occurs, the machine motion trajectory is measured to find the cause of the problem, and various parameters of a controller for controlling the motors are adjusted. A plurality of methods of measuring and displaying the machine motion trajectory are known.

In the method shown in Patent Literature 1, two high-precision steel balls are connected through a displacement gage, and the displacement when the balls are moved such that the relative distance therebetween is held constant (i.e., along an arc) is read. This method is called a ball bar method and is widely used.

Non Patent Literature 1 shows a method of measuring a motion trajectory in a machine tool using a measuring device called a cross grid encoder. In the measurement using the cross grid encoder, a scale including two orthogonally intersecting optical gratings disposed on a glass substrate and a detection head including two light-receiving units disposed so as to be orthogonal to the respective optical gratings of the scale are used to allow the measurement of two-dimensional relative displacement.

With the method shown in Patent Literature 2, three pairs of an air slide and a linear scale are combined orthogonally to allow the measurement of three-dimensional relative displacement. Patent Literature 3 shows a method of measuring the error between a machine position determined expediently from feedback signals and a machine position designated by a control unit.

CITATION LIST

Patent Literature

Patent Literature 1: Japanese Patent Application Laid-open No. S61-209857
Patent Literature 2: Japanese Patent No. 3858062
Patent Literature 3: Japanese Patent Application Laid-open No. H4-177408
Non Patent Literature 1: "Measurement of Motion Accuracy and Improvement of Machining Accuracy on Ultra-high Precision NC Machine Tools by Using Cross Grid Encoder Test" Journal of the JSPE, Vol. 62, No. 11, (1996) pp. 1612-1616

SUMMARY

Technical Problem

One problem with the method described in Patent Literature 1 is that the measurement is limited to an arc trajectory with a predetermined radius. Therefore, for example, a motion trajectory at a corner section in which machine vibrations are likely to occur cannot be measured.

In the accuracy measurement using the cross grid encoder described in Non Patent Literature 1, the gap between the scale and the head must be maintained at about 0.5 mm, and one problem is that the scale and the head are likely to come into collision to cause damage. In addition, a three-dimensional motion trajectory cannot be measured.

The method described in Patent Literature 2 allows the measurement of a three-dimensional motion trajectory. However, one problem is that the measuring device has a structure in which three slide mechanisms are disposed in an overlapping manner and therefore cannot follow high acceleration motion that causes a large inertial force. In such a case, measurement cannot be performed. In addition, since air slides are used, compressed air must be used, and therefore the device is very large.

In all the above methods, the motion trajectory is measured with a displacement gage attached to the machine. If a jig or tool, for example, has been attached to the machine tool, the jig or tool must be detached to perform the measurement. Therefore, unfortunately, the motion trajectory in the machine in actual use cannot be measured.

In all the above methods, the range of measurement is limited to a relatively small range. Therefore, if the machine motion accidentally exceeds the measurement range, the measuring device may be damaged. In addition, to measure a motion trajectory in a large stroke machine, the measuring device attached must be detached and re-attached at a different position.

In the method described in Patent Literature 3, the measuring device is not disposed on a machine, and the motion trajectory is computed from the machine position determined from feedback signals. This allows measurement over the entire movable range for any shape, and the measuring device is prevented from being damaged. However, the actual machine position is not always the same as the feedback position. For example, if the machine is vibrated or has backlash, the motion trajectory in the machine cannot be correctly evaluated.

The present invention has been made in view of the above, and it is an object of the invention to provide a machine motion trajectory measuring device that can easily and appropriately measure a motion trajectory in a machine with vibrations and backlash being reflected, a numerically controlled machine tool provided with the machine motion trajectory measuring device, and a machine motion trajectory measuring method.

Solution to Problem

To solve the above problems, the present invention provides a machine motion trajectory measuring device for measuring a motion trajectory of a machine used in an apparatus that controls the position of the machine by feeding back a detected position detected by a plurality of motors for driving a plurality of movable axes and driving the plurality of motors for the plurality of movable axes such that the detected position follows a commanded position. The machine motion trajectory measuring device includes: an accelerometer for measuring acceleration of the machine; and a motion trajectory measuring unit for measuring a motion trajectory of the machine by obtaining the position of the machine by double integration of the acceleration and correcting the position of the machine such that a profile of the position of the machine coincides with a profile of the detected position or with a profile of an estimated position estimated using a model for simulating the response of the position of the machine to the commanded position.

Advantageous Effects of Invention

In the machine motion trajectory measuring device of the present invention, an accelerometer is used for the measurement. Since the accelerometer can be disposed at any position in a movable unit, the measurement can be performed without detaching a jig or tool from the machine in use. In addition to this, a three-dimensional motion trajectory can be measured. In the machine motion trajectory measuring device of the present invention, the machine position is corrected using a detected position or an estimated position. Therefore, the problems due to the measurement and integration errors that occur when the signal from the accelerometer is integrated to compute the machine position are less likely to occur. Therefore, advantageously, the motion trajectory of the machine can be measured with vibrations and backlash being reflected.

DESCRIPTION OF EMBODIMENTS

Embodiments

A machine motion trajectory measuring device according to an embodiment of the present invention will next be described with reference to the drawings by way of an example in which a machine motion trajectory in a numerically controlled machine tool is measured. However, the present invention is not limited to the following description.

Figure 1:
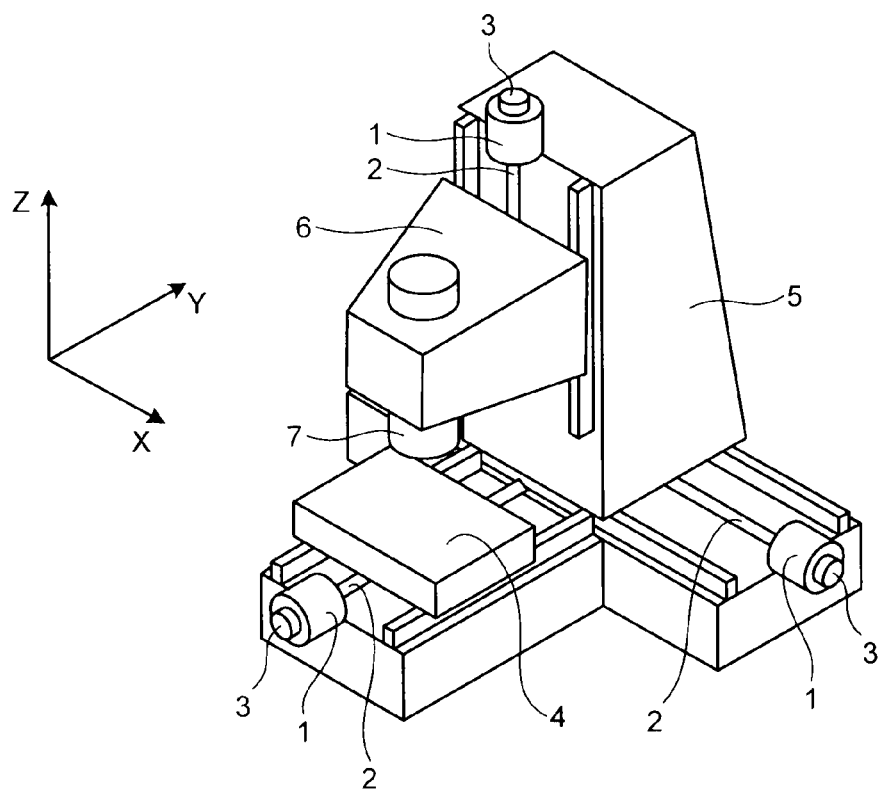
FIG. 1 is a schematic diagram illustrating a configuration of a numerically controlled machine tool provided with a machine motion trajectory measuring device according to an embodiment of the present invention.

FIG. 1 shows one example of the configuration of a numerically controlled machine tool. The numerically controlled machine tool has a plurality of movable axes, and the motions thereof are guided by the axes in X-, Y-, and Z-axis directions, respectively. Each of the movable axes is driven by a driving mechanism including a motor 1 and a feed screw 2. The rotation angles of the motors are detected by rotation angle detectors 3 and are fed-back to a control unit. In an alternative driving method, linear motors are used instead of the motors 1 and the feed screws 2, and linear scales are used instead of the rotation angle detectors 3.

In the numerically controlled machine tool having the configuration shown in FIG. 1, a work table 4 is driven by the Y-axis driving mechanism, and a column 5 is driven by the X-axis driving mechanism. A spindle head 7 is driven, through a ram 6, by the Z-axis driving mechanism, which is attached to the column 5. Therefore, a three-dimensional shape is created between a tool attached to the end of the spindle head 7 and a workpiece placed on the work table 4.

Figure 2:
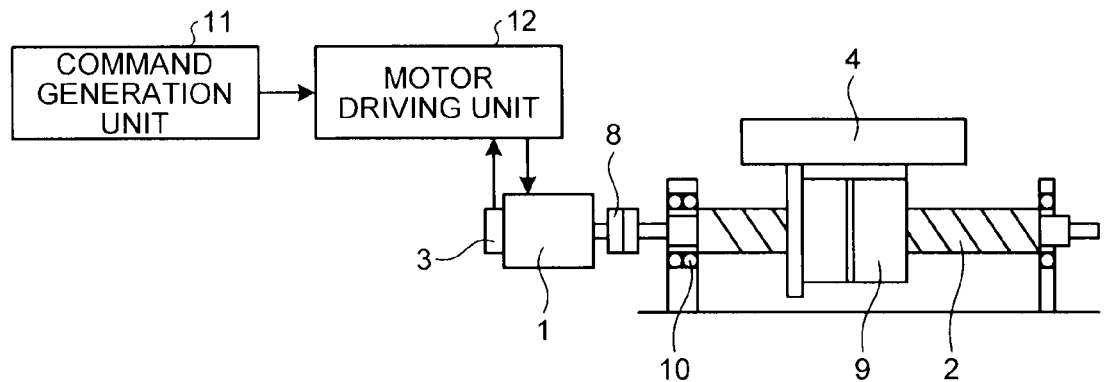
FIG. 2 is a schematic diagram illustrating the structure of a driving mechanism provided in the numerically controlled machine tool.

FIG. 2 shows a schematic side cross sectional view of the Y-axis driving mechanism shown in FIG. 1. For convenience, only the Y-axis driving mechanism is shown, but the X- and Z-axis driving mechanisms are similar to the Y-axis driving mechanism. The rotational motion of the motor 1 is transmitted to the feed screw 2 through a coupling 8 and converted to the linear motion of the table 4 through a nut 9. The linear motion of the feed screw 2 is restrained by a support bearing 10. A commanded position outputted from a command generation unit 11 of a controller is transmitted to a motor driving unit 12. The motor driving unit 12 drives the motor 1 such that the error between the commanded position and a detected position obtained by multiplying the motor rotation angle detected by the rotation angle detector 3 by the screw pitch of the feed screw 2 is minimized.

A linear scale or laser displacement gage for detecting the position of the table may be additionally provided, and the position of the table, in addition to the rotation angle of the motor 1, may be fed back to the motor driving unit 12. A linear motor may be used instead of the motor 1 and the feed screw 2.

In the numerically controlled machine tool, the relative displacement between the tool attached to the end of the spindle head 7 and the work table 4 is important. Generally, the relative displacement is measured in advance to correct errors in the machine using the command generation unit 11 or the motor driving unit 12. The causes of the errors include static errors such as squareness between the movable axes and a screw pitch error. These errors are measured and adjusted when the machine is assembled and less likely to be changed during normal use.

However, errors are known to be caused by elastic deformations and vibrations that occur mainly in the couplings 8, the feed screws 2, and the support bearings 10 and by the changes in the attitudes of the column 5 and the ram 6, the vibrations thereof, and the friction therebetween. The characteristics of these dynamic errors can be largely changed by the use condition of the machine, the load mass on the work table, the aged deterioration of the machine, friction, and the like. Therefore, it is desirable that the motion trajectory in the machine be measured regularly or continuously even during use of the machine so that various correction parameters of the controller can be adjusted.

An object of the invention is to provide a method for easily and appropriately measuring motion trajectory information necessary for the adjustment of parameters of the controller, the method being totally different from conventional measuring methods. The term "appropriately" means to include information necessary for the adjustment of the controller. More specifically, such information includes the presence or absence of vibration, the cycle and amplitude of the vibration, the presence or absence of spike-like trajectory errors (quadrant glitches) that occur during switching between quadrants, the height and width of the quadrant glitches, and the cycle and amplitude of vibration that occurs after the occurrence of a quadrant glitch.

Figure 3:
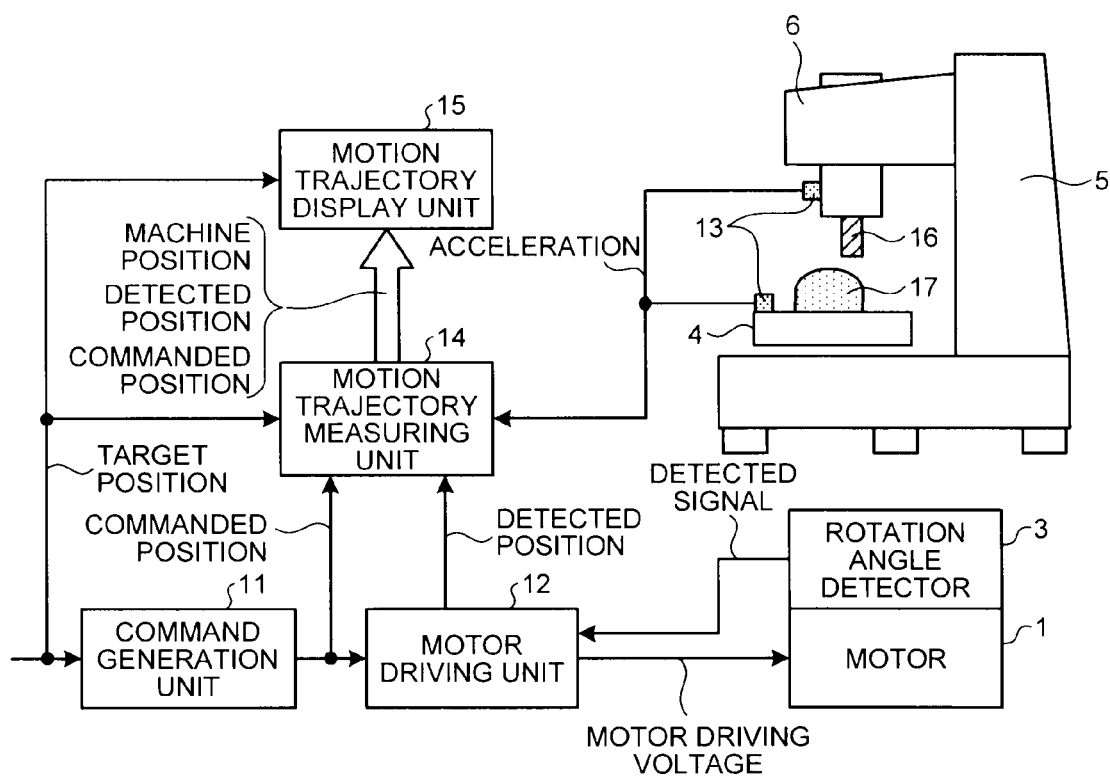
FIG. 3 is a diagram illustrating the machine motion trajectory measuring device according to the embodiment.

The machine motion trajectory measuring device according to the present invention is shown in FIG. 3. The command generation unit 11 generates a commanded position based on an inputted target position. The motor driving unit 12 outputs a motor driving voltage to drive the motors 1 such that the inputted commanded position coincides with a detected position obtained by processing detected signals transmitted from the rotation angle detectors 3 as much as possible.

The machine motion trajectory measuring device of the present invention measures the motion trajectory of a machine used in an apparatus that controls the position of the machine by feeding-back a detected position detected by a plurality of motors 1 having different movable axes and driving the motors 1 such that the detected position follows a commanded position. The machine motion trajectory measuring device includes: accelerometers 13 for measuring the acceleration of the machine; and a motion trajectory measuring unit 14 for measuring the motion trajectory of the machine. The motion trajectory is measured by integrating the acceleration twice to obtain the machine position and correcting the machine position such that the profile of the machine position substantially coincides with the profile of the detected position or the profile of an estimated position estimated by a model for simulating the response of the machine position to the commanded position.

The "profile" is a curve roughly representing the change in the machine position with a horizontal axis indicating time and a vertical axis indicating the machine position or with both the horizontal and vertical axes indicating the machine position. Imagine, for example, a single curve that is drawn using a spline so as to pass near the center of a finely oscillating waveform. The profile is also a curve obtained by multiplying the commanded position by a transfer function with a predetermined time constant and also a curve approximating the change in the machine position using straight lines, an n-th order polynomial, or sine or cosine waves.

A motion trajectory display unit 15 combines a plurality of target positions to be inputted to the command generation unit 11 to form a target trajectory, combines commanded positions outputted from the command generation unit 11 to form a commanded trajectory, and also combines a plurality of fed-back detected positions to form a detected portion trajectory. Then the motion trajectory display unit 15 displays at least one of the target trajectory, the command trajectory, and the detected portion trajectory and a machine motion trajectory formed by combining machine positions outputted from the motion trajectory measuring unit 14 in a superposed manner.

In the present invention, the machine motion trajectory is measured using accelerometers. Therefore, as shown in FIG. 3, the machine motion trajectory can be measured with a tool 16 and a workpiece 17 attached, and a three-dimensional free shape can also be measured. Generally, when signals from accelerometers are integrated to compute a position, a problem occurs due to errors in the acceleration measurement and integration errors. However, in the machine motion trajectory measuring device of the present invention, upon measurement of the acceleration, the machine position is corrected in the motion trajectory measuring unit using the commanded position and detected position, which are signals used in the control unit. Therefore, the errors in the acceleration measurement and the integration errors can be corrected.

In addition, all or part of the target trajectory, the commanded trajectory, the detected portion trajectory, and the machine motion trajectory are displayed in a superposed manner. Therefore, if an error has occurred in the machine motion trajectory, the stage at which the trajectory error has occurred can be clearly shown.

In this case, the trajectory error can be more clearly shown on the display by enlarging the error in the normal direction to the target trajectory between the target trajectory and each of the commanded trajectory, the detected portion trajectory, and the machine motion trajectory. Moreover, by enlarging the normal direction error between the commanded trajectory and the detected portion trajectory, between the commanded trajectory and the machine motion trajectory, or between the detected portion trajectory and the machine motion trajectory on the display, only the trajectory error caused by the motor driving unit 12 or the trajectory error caused by the driving mechanisms, for example, can be extracted.

The method of computing a position by integrating acceleration is well-known and used, for example, to measure vibrations in an inertial navigation system and buildings. However, the accuracy of measurement is known to be several meters for an inertial navigation system and several tens of millimeters for buildings and is 4 to 6 orders of magnitude worse than the accuracy required for the measurement in numerically controlled machine tools. Problems when acceleration is integrated to compute a position include a problem due to the errors in the measurement of the acceleration and a problem due to the errors in the integration calculation. The present invention solves the above problems and provides a method of measuring a machine motion trajectory with high accuracy.

When an acceleration is integrated, the amount of error accumulated increases as the measurement time increases, and the accuracy of the measurement is impaired. To adjust the controller, correction parameters for a trajectory error mainly due to the vibration and friction in the machine are adjusted. Therefore, it is sufficient to display the motion trajectory in a region in which the trajectory error due to such a dynamic behavior occurs. More specifically, a motion trajectory error occurring region in which a trajectory error is expected to occur is determined from one or both of the commended position and the detected position using a predetermined rule or formula, and the acceleration in this motion trajectory error occurring region is integrated twice to compute the machine position.

The above predetermined rule or formula is a rule or formula for indicating a region in which a trajectory error is empirically known to occur or a rule or formula for determining the occurrence of a trajectory error from an estimated machine position estimated using a model for simulating the response characteristics of the machine position to the commanded position.

In the above manner, only the acceleration in a region in which a trajectory error is likely to occur can be integrated to compute the machine position. Therefore, it is not necessary to perform the integration computation longer than necessary, and the time required for the measurement of the machine motion trajectory can thereby be reduced. In addition, the dynamic trajectory error that is likely to be changed according to the use conditions of the machine can be easily and appropriately measured.

By displaying the machine motion trajectory in the motion trajectory error occurring region and the target trajectory, the commanded trajectory, or the detected portion trajectory in a superposed manner, the trajectory information required for the adjustment of the controller can be appropriately displayed.

Also in this case, the trajectory error can be more clearly shown on the display by enlarging the error in the normal direction to the target trajectory between the target trajectory and each of the commanded trajectory, the detected portion trajectory, and the machine motion trajectory. Moreover, by enlarging the normal direction error between the commanded trajectory and the detected portion trajectory, between the commanded trajectory and the machine motion trajectory, or between the detected portion trajectory and the machine motion trajectory on the display, only the trajectory error caused by the motor driving unit 12 or the trajectory error caused by the driving mechanisms, for example, can be extracted.

Figure 4:
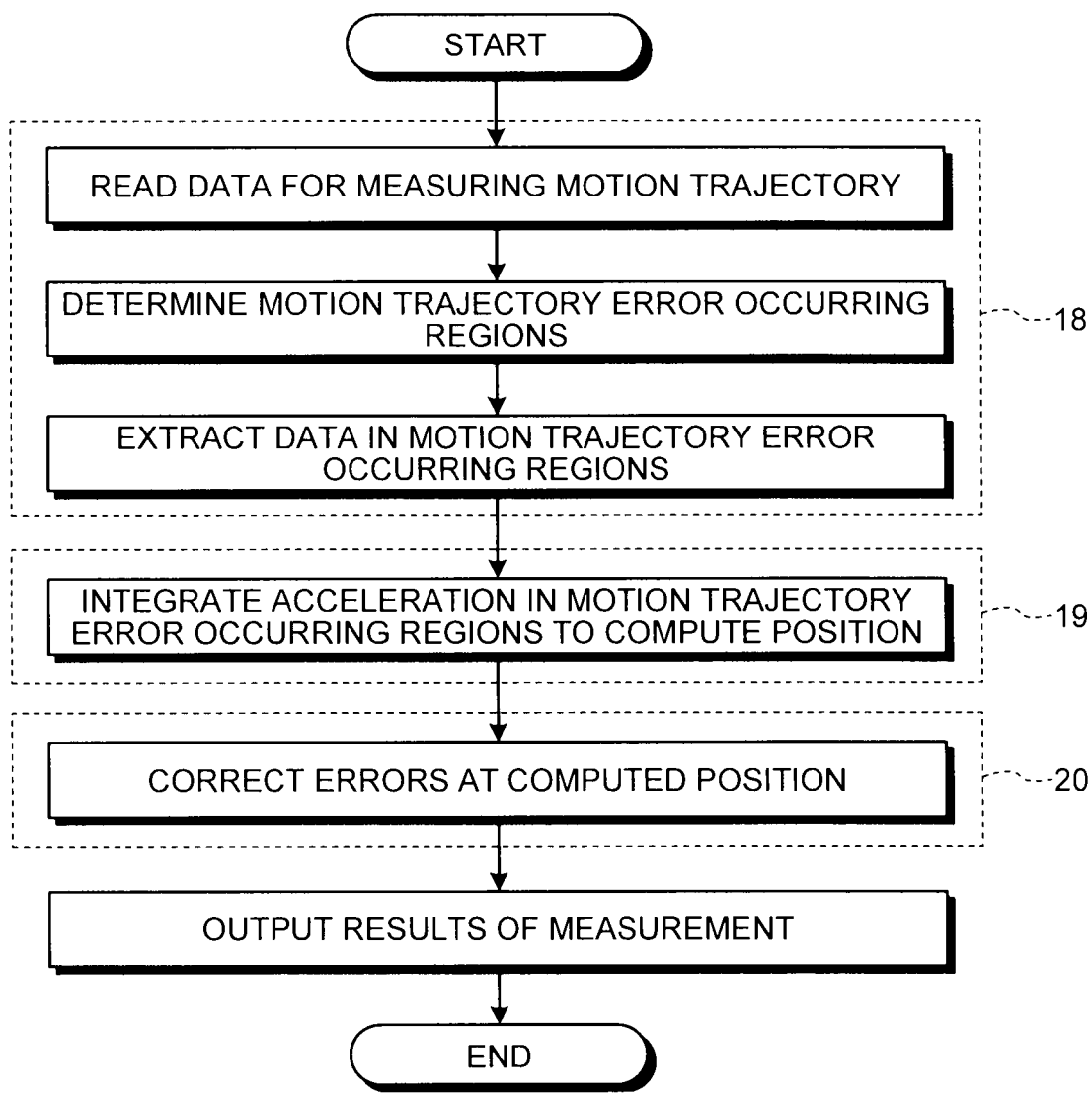
FIG. 4 is a diagram illustrating a motion trajectory measuring method in the machine motion trajectory measuring device according to the embodiment.

In a specific example below, a detailed description will be given of a method of computing a machine position by determining a motion trajectory error occurring region and then integrating an acceleration in the motion trajectory error occurring region twice. As shown in a flowchart in FIG. 4, in the motion trajectory measuring unit 14, data used to measure the motion is read, and a motion trajectory error occurring region in which a trajectory error is expected to occur is determined from one or both of the commanded position and the detected position, which are the read data, using a predetermined rule or formula. Then the acceleration in the motion trajectory error occurring region is integrated twice to compute the machine position, and the error in the computed machine position is corrected.

Figure 5:
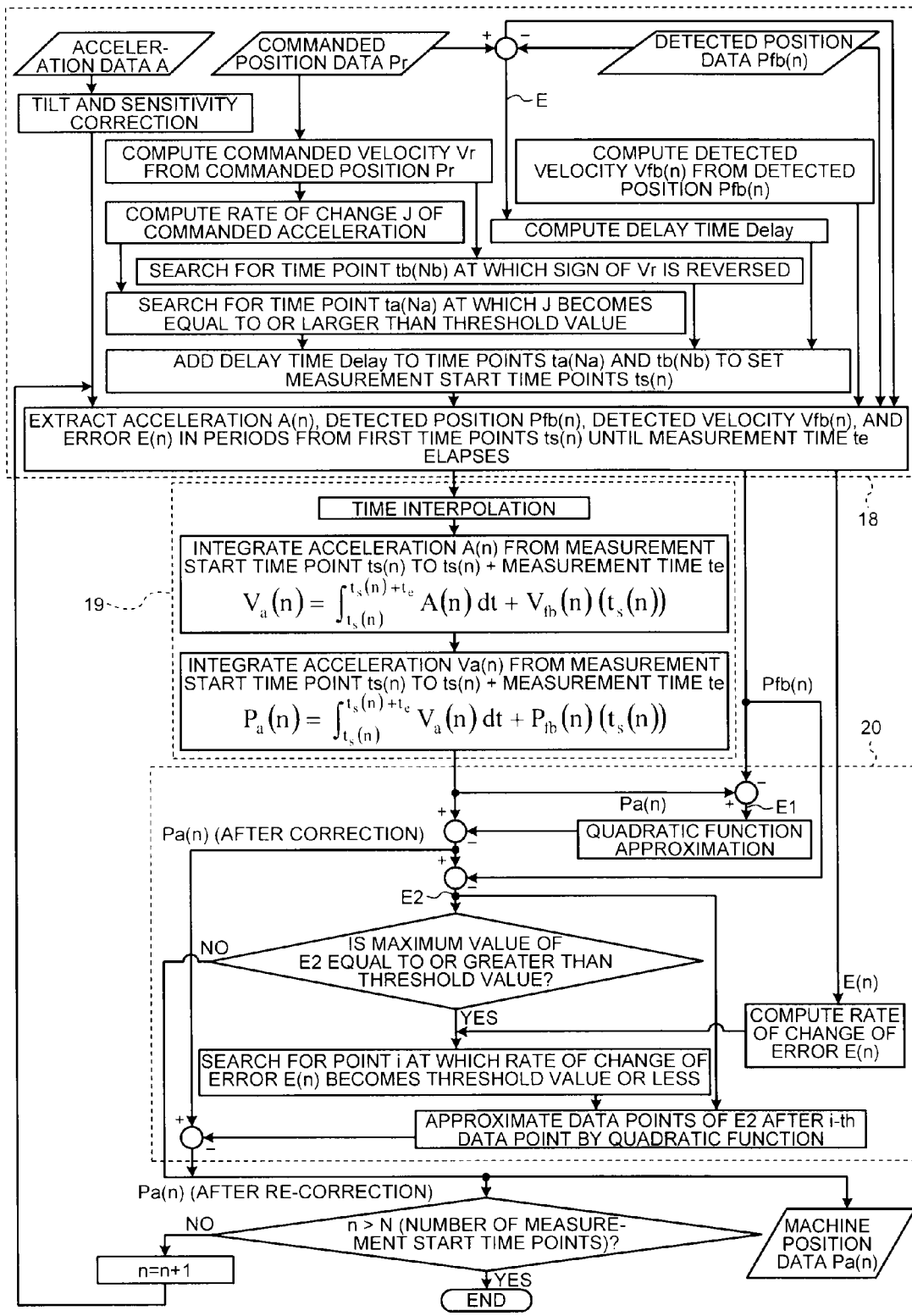
FIG. 5 is a diagram illustrating the detail of an example of the motion trajectory measuring method in the machine motion trajectory measuring device according to the embodiment.

A specific example of the motion trajectory measuring method in the motion trajectory measuring unit 14 in FIG. 3 is shown in FIG. 5. The motion trajectory measuring method in the motion trajectory measuring unit 14 in this example includes: machine motion trajectory measuring data extracting steps 18; acceleration integrating step 19; and integration error correcting step 20.

In the machine motion trajectory measuring data extracting means 18, a time point at which the sign of a commanded velocity obtained by differentiating the commanded position is reversed and a time point at which the rate of change of the acceleration (which is also referred to as jolt or jerk) obtained by differentiating the commanded position three times exceeds a predetermined threshold value are recorded. Then a delay time of the detected position relative to the commanded position is added to the recorded time points to compute start time points, and time periods from the start time points until a predetermined time elapses is set as motion trajectory error occurring regions. The detection sensitivity in the motion trajectory error occurring regions can be changed by changing the threshold value for the rate of change J of acceleration, and it is appropriate to set the threshold value to about several to several tens of m/s$^3$.

More specifically, commanded position data Pr is differentiated with respect to time to compute a commanded velocity Vr. The commanded velocity Vr is differentiated twice to compute the rate of change J of the commanded acceleration, and time points ta(Na) at which the rate of change J of the commanded acceleration becomes a predetermined threshold value or more and time points tb(Nb) at which the sign of the commanded velocity Vr is reversed are searched for. Here, Na is the number of times the rate of change J of the commanded acceleration becomes the threshold value or more, and Nb is the number of times the sign of the commanded velocity Vr is reversed. The threshold value for the rate of change J of the commanded acceleration may be changed according to the required performance of the machine used for the measurement and adjustment.

It is generally known that a certain delay time is present between the commanded position and the detected position. Therefore, in the machine motion trajectory measuring data extracting means 18, an error E between the commanded position data Pr and detected position data Pfb is determined, and the delay time Delay is computed from the error E. It is well known that the delay time can be computed from the error E in motion. The delay time may not be computed from the difference between the commanded position data Pr and the detected position data Pfb and may be computed using a model for simulating the response of the control system.

The delay time Delay is added to the time points ta(Na) at which the rate of change J of the commanded acceleration becomes the threshold value or more and to the time points tb(Nb) at which the sign of the commanded velocity Vr is reversed, and measurement start time points ts(N) are thereby set. Here, N is the number of the measurement start time points ts and is the sum of Na and Nb. A large rate of change of acceleration indicates that the acceleration is changed sharply. The reversal of the sign of the velocity indicates that the moving direction is reversed. Therefore, each of the measurement start time points ts represents a time point at which the acceleration of the motion is changed sharply or a time point at which the direction of the motion is reversed.

It is generally known that, in a region in which the acceleration is changed sharply, as vibration is induced in the machine, a trajectory error is likely to occur, and in a region in which the direction of the motion is reversed, as the direction of friction is reversed, a trajectory error is likely to occur. More specifically, by extracting such regions, motion trajectory error occurring regions in which a motion trajectory error is likely to occur can be appropriately determined.

It is well known that the behavior of the trajectory error caused by the vibration induced in the machine or by the change of friction upon reversal of the motion direction is dynamic, i.e., changes with time. Therefore, by extracting data in a period from a measurement start time point ts until a predetermined measurement time te elapses, a motion trajectory error occurring region can be set. The value of the measurement time te may be changed according to the dynamic characteristics of the machine used for the measurement, and an appropriate time is about 0.1 seconds to 0.5 seconds.

The motion trajectory error occurring regions may be set by estimating the motion trajectory of the machine using a model for simulating the response characteristics of the machine position to the commanded position and determining regions in which the trajectory error between the estimated motion trajectory and the target trajectory exceeds a preset allowance. In this manner, the occurrence of a trajectory error that is not due to the steep change in acceleration and the reversal of the motion direction can be predicted, and the machine motion trajectory in such a case can be measured. The allowance for the trajectory error can be changed according to the accuracy required for the machine used for the measurement but is preferably several to several tens of micrometers.

When the acceleration is measured, it is desirable that the sensitivity directions of the accelerometers coincide with the moving directions of the movable axes of the machine. If the sensitivity directions of the accelerometers do not coincide with the moving directions of the movable axes of the machine, or if the sensitivity of the accelerometers is different from a preset sensitivity, the results of the acceleration measurement must be corrected. Various methods for correcting acceleration are well known. For example, the correction coefficient for acceleration can be computed from the results of acceleration measurement when the machine is moved at a known acceleration.

In the acceleration integrating step 19, the results of the acceleration measurement is subjected to interpolation at intervals shorter than the measurement period and is then integrated. In this manner, the machine motion trajectory can be computed with high accuracy without measuring the acceleration at a frequency higher than necessary. The acceleration measurement period can be changed according to the vibration characteristics of the machine used for the measurement but is set preferably to about 0.001 seconds to about 0.002 seconds (about 1,000 Hz to about 500 Hz), and the interpolation intervals for the data are set preferably to about 0.0001 seconds (about 10,000 Hz).

When acceleration A(n) in a motion trajectory error occurring region is integrated to compute the machine position, first, the detected position Pfb(n) is differentiated to compute a detected velocity Vfb(n). Then, the acceleration is integrated with the detected velocity Vfb(ts(n)) at the first time point ts(n) in the motion trajectory error occurring region being set as an initial value to thereby compute a machine velocity Va(n) (equation (1)). Further, the machine velocity Va(n) is integrated with the detected position Pfb(ts(n)) at the first time point ts(n) in the motion trajectory error occurring region being set as an initial value to thereby compute a machine position Pa(n) (equation (2)). Here, n is the sequence number of the measurement start time point ts and is 1 to N.

$$V_a(n) = \int_{t_s(n)}^{t_e(n)+t_e} A(n)dt + V_{fb}(n)(t_s(n)) \quad (1)$$

$$P_a(n) = \int_{t_s(n)}^{t_s(n)+1_e} V_a(n)dt + P_{fb}(n)(t_s(n)) \quad (2)$$

In this manner, it is not necessary to continuously integrate the waveform of the acceleration from the motion start time, and the acceleration waveform only in truly necessary short periods of time can be integrated. Therefore, the amount of computation can be dramatically reduced, and the machine position can be computed with high accuracy.

The machine position may be computed as follows. An estimated position and an estimated velocity are computed using a model for simulating the response characteristics of the machine position to the commanded position, and the acceleration is integrated with the estimated velocity at the first time point in a motion trajectory error occurring region being set as an initial value to thereby compute a machine velocity. Then the machine velocity is integrated with the estimated position at the first time point in the motion trajectory error occurring region being set as an initial value to thereby compute a machine position. In this manner, even when corrections such as a pitch error correction and a backlash correction are used, a position free from the influence of these corrections can be estimated to compute the machine position.

Figure 6:
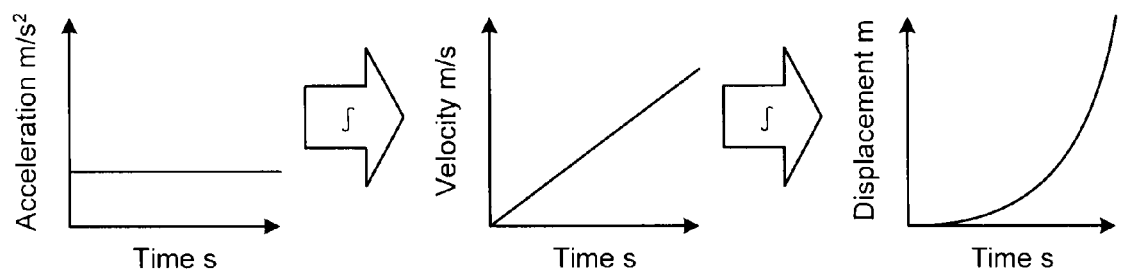
FIG. 6 is a series of diagrams showing the influence of the errors in acceleration measurement on velocity and position.

When acceleration is integrated to compute a position, errors in the acceleration measurement and integration errors are accumulated and affect the results. In the integration error correcting step 20, the errors in the acceleration measurement and integration errors are corrected. FIG. 6 is a series of schematic diagrams showing the influence on the position obtained by integrating acceleration when the measurement of the acceleration includes a constant errors. If the acceleration includes a constant error, the error appears as a quadratic function of time when the acceleration is integrated twice.

To extract an error component from the machine position Pa(n) computed in the acceleration integrating step 19 and correct the extracted error component, the difference E1 between the detected position Pfb(n) and the machine position Pa(n) computed from the acceleration is computed in each motion trajectory error occurring region. An example of the error E1 computed from actual measurement results is shown by a solid line in FIG. 7. The error is approximated by a quadratic function of time, and a correction is made by subtracting the position computed using the approximate expression from the machine position Pa(n) to correct the errors in the acceleration measurement and the integration errors. The correction may be made using a model for simulating the response characteristics of the machine position to the commended position, instead of the detected position Pfb(n).

Figure 7:
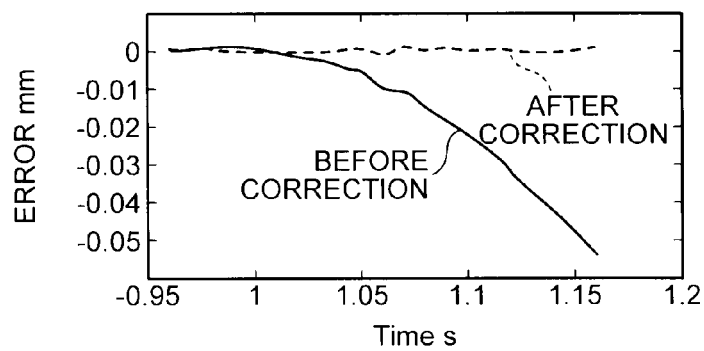
FIG. 7 is a diagram showing an example of the difference between a machine position computed from acceleration and a detected position.

The difference between the machine position Pa(n) corrected by the above method and the detected position Pfb(n) is shown by a broken line in FIG. 7. This corresponds to E2 in FIG. 5. As can be seen from FIG. 7, the difference between the machine position Pa(n) and the detected position Pfb(n) has been eliminated except for small fluctuations, and therefore the errors in the acceleration measurement and the integration errors have been corrected. In addition, the remaining difference between the machine position Pa(n) and the detected position Pfb(n) fluctuates with small amplitude around zero, and this shows that the profile of the machine position and the profile of the detected position substantially coincide with each other. The small fluctuations in the figure represent the difference between the detected position and the machine position and are caused by the driving mechanisms and the motion trajectory errors in the machine.

In the results shown in FIG. 7, the error E2 after the correction is small, and a sufficient measurement accuracy can be obtained after one correction. In this case, the correction process is ended according to the flowchart in FIG. 5, and the results are stored as machine position data Pa(n).

Figure 8:
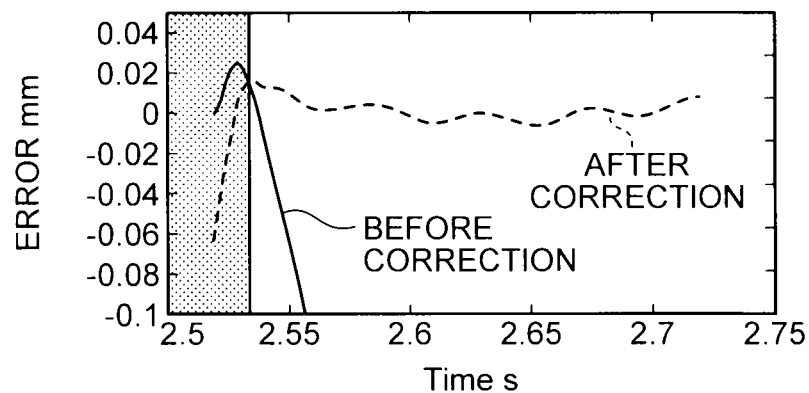
FIG. 8 is a diagram showing an example of the difference between a machine position computed from acceleration and a detected position.

However, if the acceleration is steeply changed such as in the behavior at corner sections, the errors may not be corrected accurately by a single correction. An example of the error between the machine position Pa(n) computed from acceleration and the detected position Pfb(n) in such a case is shown in FIG. 8. In FIG. 8, even after the correction described above (a broken line), the error is large in the region before 2.55 seconds, and the entire waveform has a warped shape. This is because the data including data in the hatched region in FIG. 8 is approximated by a quadratic function for the correction. The hatched region corresponds to a region in which the difference E between the commanded position and the detected position is largely changed.

Therefore, when the error E2 between the detected position Pfb(n) and the machine position Pa(n) computed from the acceleration and subjected to the first correction is equal to or greater than a preset threshold value, the rate of change of the error E(n) between the commanded position Pr(n) and the detected position Pfb(n) is computed according to the flowchart shown in FIG. 5. Then the detected position or the estimated position in a region in which the above rate of change is equal to or less than the preset threshold value is extracted, and the correction is again made using the extracted detected position or estimated position. The threshold value for the error E2 may be changed according to the characteristics of the machine used for the measurement but is preferably about ten to several tens of micrometers. A model for simulating the response characteristics of the machine position to the commanded position may be used instead of the detected position Pfb(n).

Figure 9:
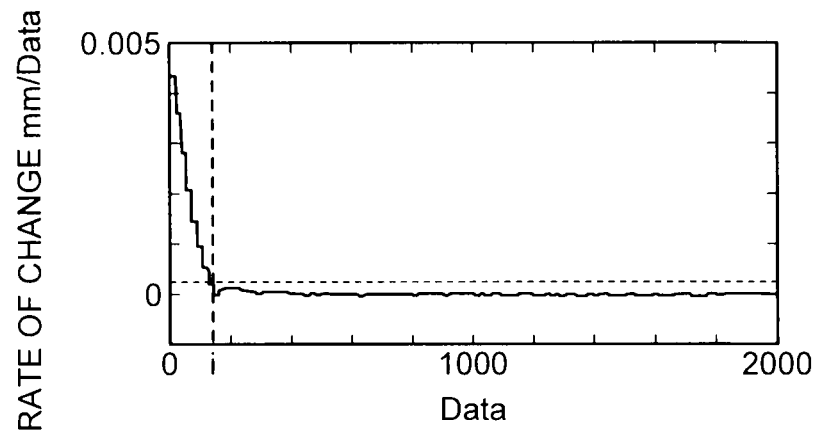
FIG. 9 is a diagram showing an example of the rate of change of the error between a commanded position and a detected position.

The rate of change of the error E(n) between the commanded position Pr(n) and the detected position (Pfb(n)) in the same motion trajectory error occurring region as that used for the results shown in FIG. 8 is shown in FIG. 9. In FIG. 9, the error E(n) changes steeply before an i-th data point. The re-correction is made as follows. The data number i at which the rate of change of the error (E) is equal to or less than the preset threshold value is searched for, and the data points of the error E2 between the corrected machine position Pa(n) and the detected position Pfb(n) after the i-th data point are approximated by a quadratic function of time. Then the re-correction is made by subtracting the position computed using the approximation expression from the machine position Pa(n). The measure of the threshold value for the rate of change of the error E(n) is the positional resolution of the commanded position and the detected position.

Figure 10:
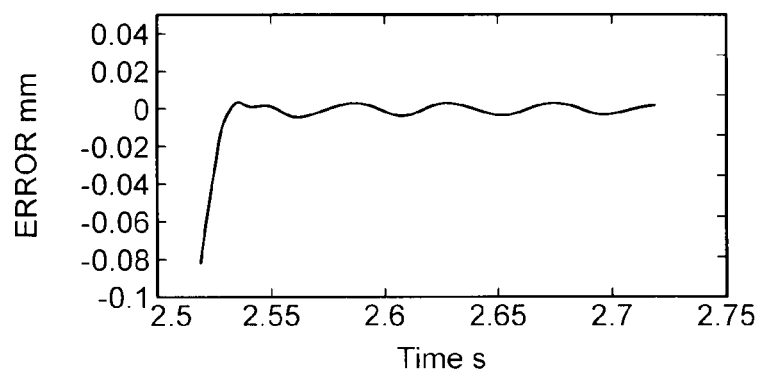
FIG. 10 is a diagram showing an example of the results corrected using the data in a region where the rate of change of the error between a commanded position and a detected position is a threshold value or less.

The error between the machine position Pa(n) and the detected position Pfb(n) after the re-correction is made using the data points of the error E2 between the corrected machine position Pa(n) and the detected position Pfb(n) after the i-th data point is shown in FIG. 10. In FIG. 10, the error in the region before 2.55 seconds remains present, but the error causing the warpage of the entire waveform present before the re-correction has been removed. Therefore, even in the motion including abrupt acceleration and deceleration such as the motion at a corner section, the errors in the acceleration measurement and integration errors can be corrected, and the machine motion trajectory can be computed with high accuracy.

The results after the corrections are stored as machine position data Pa(n). When the sequence number n of the current measurement start time point ts is smaller than the number N of the measurement start time points ts, one is added to the sequence number n, and the process returns to the machine motion trajectory measuring data extracting steps 18. Then the processing in the acceleration integrating means step 19 and the integration error correcting step 20 is repeated until the sequence number n of the current measurement start time point ts reaches the number N of the measurement start time points ts. In this manner, the machine position in all the motion trajectory error occurring regions can be computed. The above processing is performed for all the plurality of movable axes, and the data sets for the plurality of axes are combined in the motion trajectory display unit 15 to form a machine motion trajectory.

To examine the validity of the method of the present invention, the machine motion trajectory of a numerically controlled machine tool was actually measured on an XY plane. For comparison, the same measurement was performed by the cross grating encoder method, which is a method practically used.

Figure 11:
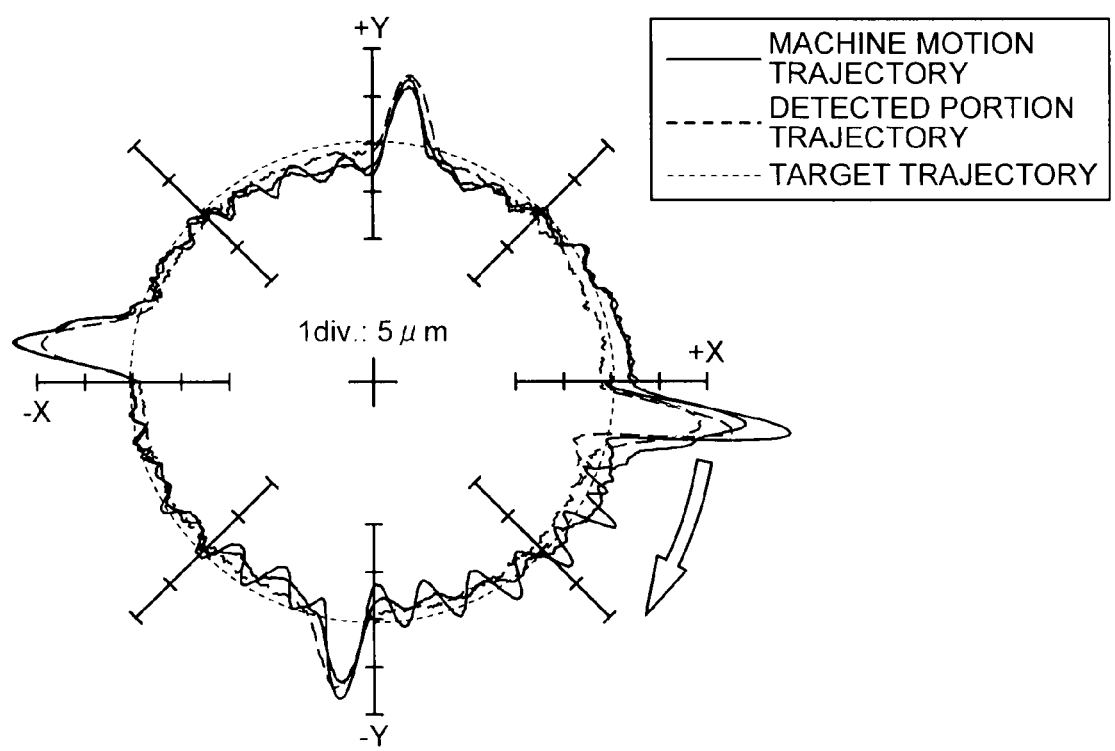
FIG. 11 is a diagram showing an example of the results of the measurement of a circular motion trajectory by the cross grating encoder method.

FIG. 11 shows the results of the measurement of the machine motion trajectory during a circular motion with a radius of 10 mm at a feeding speed of 3,000 mm/min using a cross grating encoder. In the figure, the difference from the target trajectory is enlarged on the display, and the detected portion trajectory and the target trajectory, as well as the machine motion trajectory, are shown. In FIG. 11, the machine motion trajectory has an ellipsoidal shape with its major axis extending in the X-axis direction. This is due to the elastic deformation in the X-axis direction and is an error not to be measured in the present invention. The errors to be measured in the present invention are spike-like errors (quadrant glitches) that occur in regions at the boundaries between quadrants and vibrations on the trajectory. However, it can be seen that vibrations and quadrant glitches different from those on the detected portion trajectory are present on the machine motion trajectory.

Figure 12:
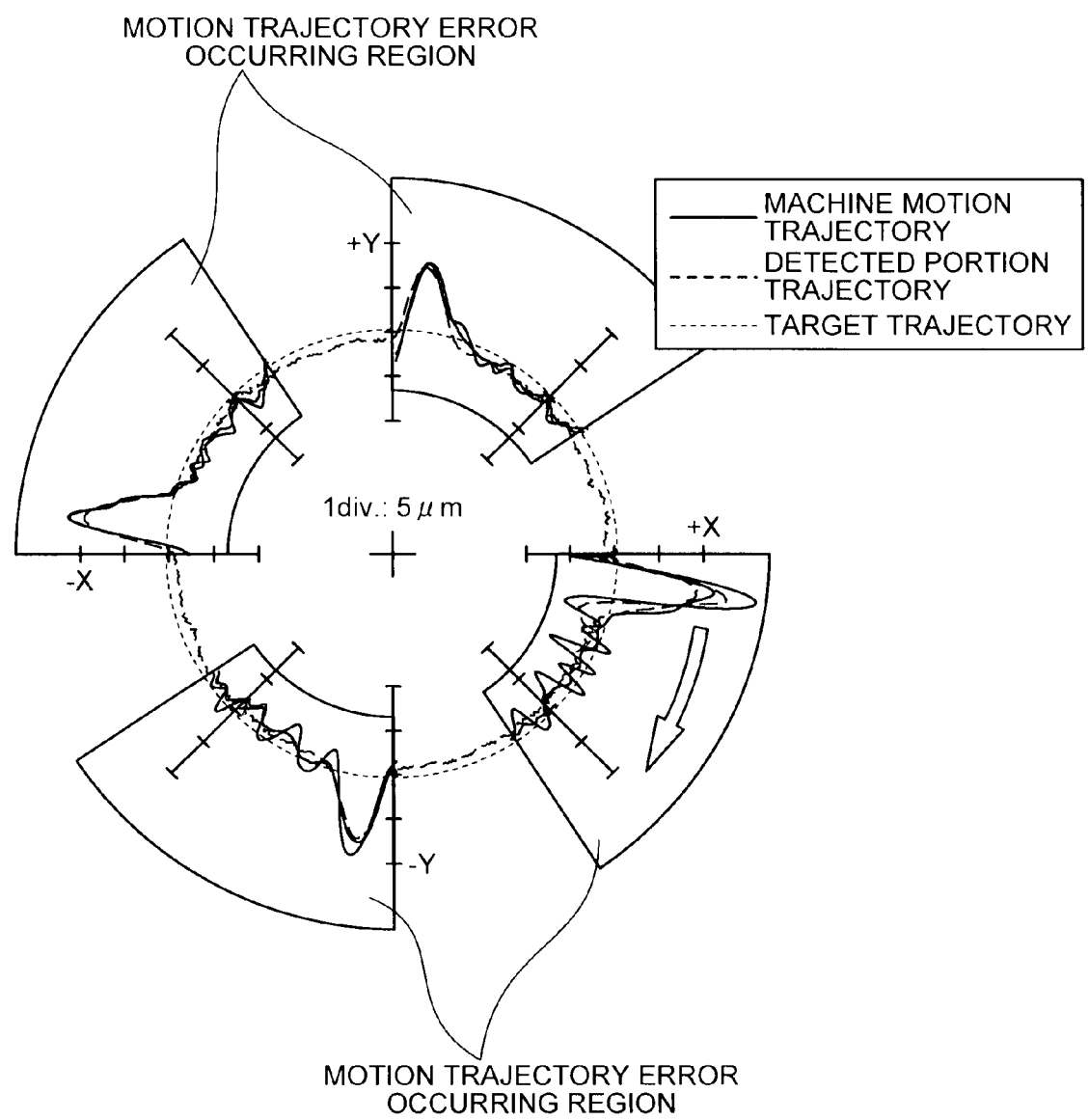
FIG. 12 is a diagram showing an example of the results of the measurement of the circular motion trajectory using the machine motion trajectory measuring device according to the present invention.

FIG. 12 shows the results of the measurement of the machine motion trajectory using the machine motion trajectory measuring device of the present invention. In FIG. 12, regions determined as motion trajectory error occurring regions are shown, and the machine motion trajectory in these regions is shown. As shown in FIG. 12, even when the machine motion trajectory was measured from acceleration using the machine motion trajectory measuring device of the present invention, the vibrations and quadrant glitches on the machine motion trajectory could be appropriately displayed, as in the case when the machine motion trajectory was measured using the cross grating encoder.

Figure 13:
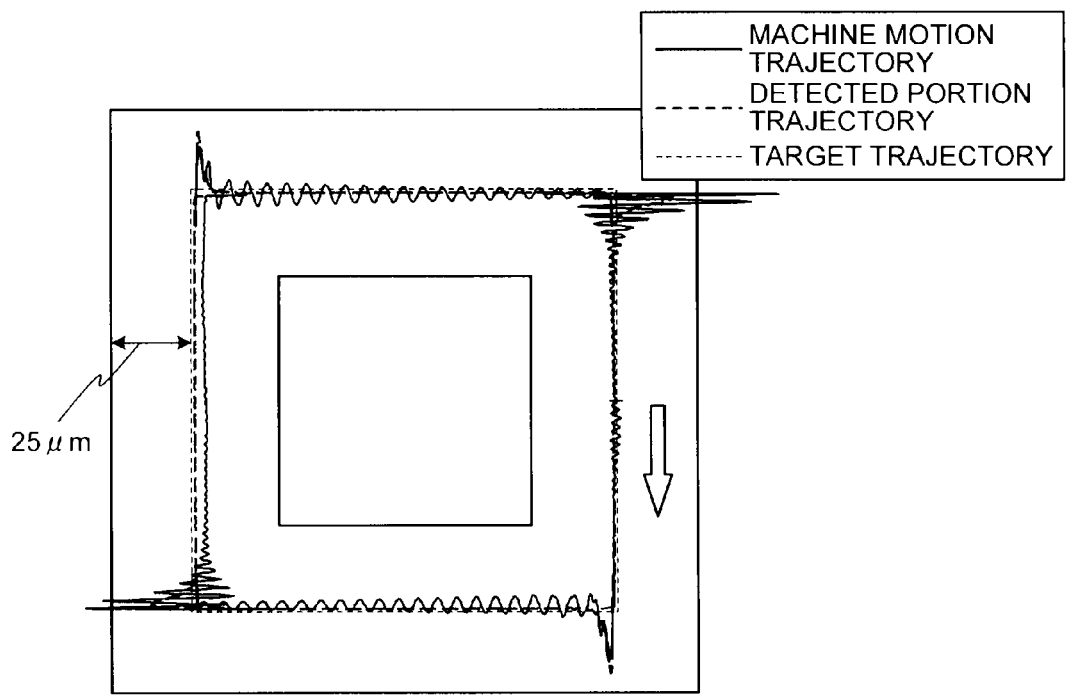
FIG. 13 is a diagram showing an example of the results of the measurement of a motion trajectory at corner sections by the cross grating encoder method.

FIG. 13 shows the results of the measurement of a machine motion trajectory using a cross grating encoder when a square trajectory was designated. The error relative to the target trajectory is enlarged on the display. Vibrations are known to be likely to occur at four corner sections because the acceleration changes steeply. In FIG. 13, vibrations not observed in the detected portion trajectory are found on the machine motion trajectory.

Figure 14:
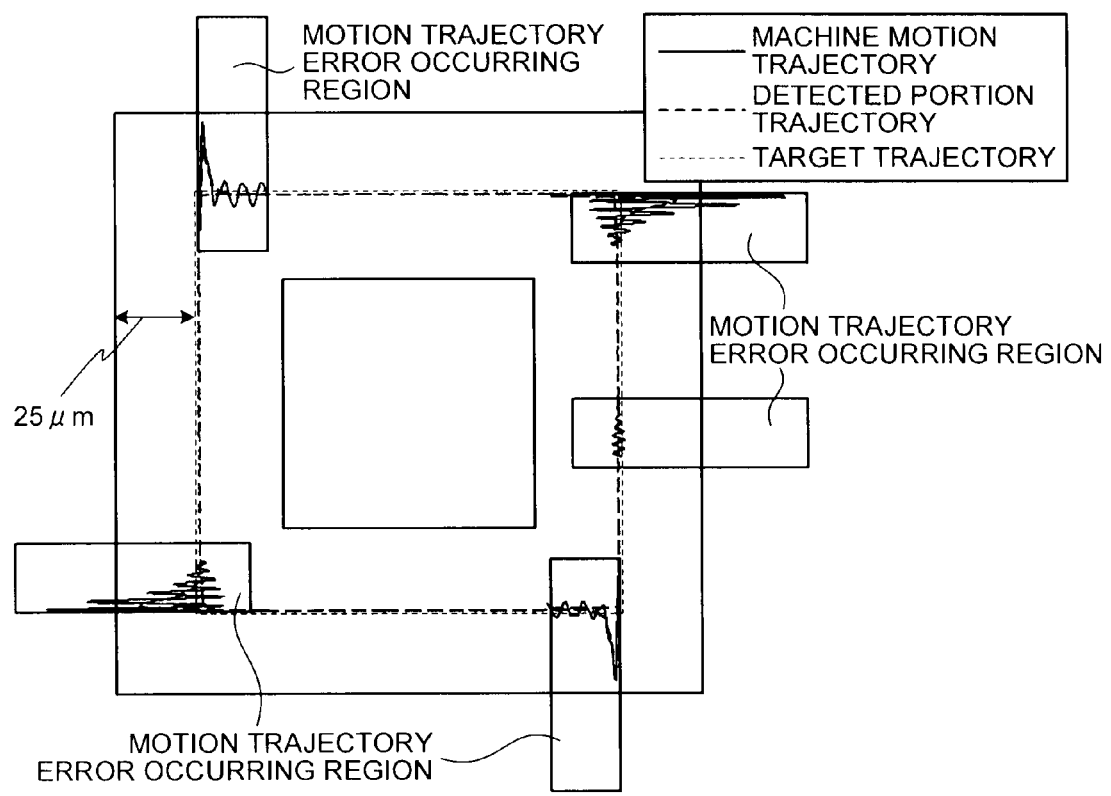
FIG. 14 is a diagram showing an example of the results of the measurement of the motion trajectory at corner sections using the machine motion trajectory measuring device according to the present invention.

The results of the measurement of the machine motion trajectory using the machine motion trajectory measuring device of the present invention are shown in FIG. 14. In FIG. 14, the regions surrounded by rectangles are motion trajectory error occurring regions determined by the method of the present invention in which a trajectory error is likely to occur, and the machine motion trajectories in these regions are displayed. As shown in FIG. 14, even when the machine motion trajectory was measured from acceleration using the machine motion trajectory measuring device of the present invention, vibrations not observed in the detected portion trajectory could be measured, as in the case when the machine motion trajectory was measured using the cross grating encoder. With the machine motion trajectory measuring device of the present invention, the machine motion trajectory can be appropriately measured even at corner sections.

More specifically, with the machine motion trajectory measuring and displaying device of the present invention, motion trajectory error occurring regions can be automatically detected, and the machine motion trajectory in these regions can be appropriately measured using accelerometers. In addition, when an error has occurred in the machine motion trajectory, the stage at which the trajectory error has occurred can be clearly shown by displaying the commanded trajectory, the detected portion trajectory, and the machine motion trajectory in a superposed manner.

Figure 15:
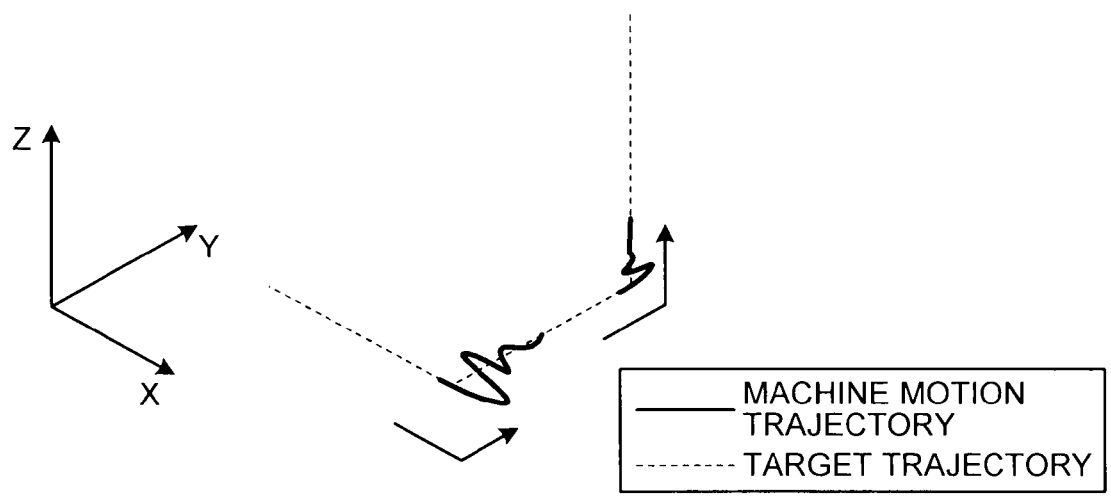
FIG. 15 is a diagram showing an example of the results of the measurement of a three-dimensional motion trajectory.

FIG. 15 shows an example of the measurement of a three-dimensional machine motion trajectory. The trajectory shown in FIG. 15 is a trajectory obtained by moving the X-axis of the machine in a positive direction, moving the Y-axis in a positive direction, and then moving the Z-axis in a positive direction. With the method of the present invention, even for a three-dimensional trajectory, motion trajectory error occurring regions can be determined, and the machine motion trajectory can be measured as shown in FIG. 15.

INDUSTRIAL APPLICABILITY

As described above, the machine motion trajectory measuring device according to the present invention is suitable for the measurement of the motion trajectory of a machine used in a numerically controlled machine tool or robot.

REFERENCE SIGNS LIST

1 MOTOR
2 FEED SCREW
3 ROTATION ANGLE DETECTOR
4 WORK TABLE
5 COLUMN
6 RAM
7 SPINDLE HEAD
8 COUPLING
9 NUT
10 SUPPORT BEARING
11 COMMAND GENERATION UNIT
12 MOTOR DRIVING UNIT
13 ACCELEROMETER
14 MOTION TRAJECTORY MEASURING UNIT
15 MOTION TRAJECTORY DISPLAY UNIT
16 TOOL
17 WORKPIECE
18 MACHINE MOTION TRAJECTORY MEASURING DATA EXTRACTING STEPS
19 ACCELERATION INTEGRATING STEP
20 INTEGRATION ERROR CORRECTING STEP

The invention claimed is:

1. A machine motion trajectory measuring device for measuring a motion trajectory of a machine position, wherein the machine position is a relative position of a tool of a machine with respect to a work table controlled by a motor, a motor position of the motor being detected by a detector, and the motor is driven such that the detected motor position follows a commanded position, the machine motion trajectory measuring device comprising:
an accelerometer for measuring acceleration of the tool of the machine or the work table; and
a motion trajectory measuring unit which measures the motion trajectory of the machine position by
obtaining the measured acceleration measured by the accelerometer,
determining motion trajectory error occurring regions, in which a trajectory error is expected to occur, based on a rate of change of the acceleration obtained by differentiating the commanded position three times and exceeding a preset threshold value, and a reversal of a sign of a commanded velocity obtained by differentiating the commanded position,
extracting the measured acceleration at the motion trajectory error occurring regions,
integrating the measured acceleration at the motion trajectory error occurring regions twice to compute the machine position,
correcting errors for the computed machine position such that a profile of the corrected machine position coincides with a profile of the detected motor position or with a profile of an estimated position estimated using a model for simulating a response of the machine position to the commanded position, and
obtaining a trajectory of the corrected machine position as the motion trajectory of the machine position.

2. The machine motion trajectory measuring device according to claim 1, wherein, to determine the motion trajectory error occurring regions, the motion trajectory measuring unit: stores a time point at which the sign of the commanded velocity obtained by differentiating the commanded position is reversed and a time point at which the rate of change of the acceleration exceeds a preset threshold value; adds a delay time of the detected position relative to the commanded position to the time points to compute start time points; sets and extracts time periods from the start time points until a predetermined time elapses as motion trajectory error occurring regions in which a trajectory error is expected to occur.

3. The machine motion trajectory measuring device according to claim 2, wherein the motion trajectory measuring unit obtains the machine position by: computing a detected velocity by differentiating the detected position when the acceleration is integrated in the motion trajectory error occurring regions; computing a machine velocity by integrating the acceleration with the detected velocity at a first time point in each of the motion trajectory error occurring regions being set as an initial value; and integrating the machine velocity with the detected position at the first time point in each of the motion trajectory error occurring regions being set as an initial value.

4. The machine motion trajectory measuring device according to claim 2, wherein the motion trajectory measuring unit obtains the machine position by: computing the estimated position and an estimated velocity using the model simulating the response characteristics of the position of the machine to the commanded position when the acceleration is integrated in the motion trajectory error occurring regions; computing a machine velocity by integrating the acceleration with the estimated velocity at a first time point in each of the motion trajectory error occurring regions being set as an initial value; and integrating the machine velocity with the estimated position at the first time point in each of the motion trajectory error occurring regions being set as an initial value.

5. The machine motion trajectory measuring device according to claim 2, wherein the motion trajectory measuring unit corrects the machine position by: computing an error between the machine position in each of the motion trajectory error occurring regions and the estimated position or the detected position; approximating the computed error by a quadratic function of time; and subtracting a position computed using the approximated function from the machine position.

6. The machine motion trajectory measuring device according to claim 5, wherein the motion trajectory measuring unit re-corrects the machine position by: computing a rate of change of an error between the commanded position and the detected position or the estimated position when an error between the corrected machine position and the estimated position or the detected position is equal to or more than a preset threshold value; extracting the estimated position or the detected position in a region where the rate of change is equal to or less than a preset threshold value; re-computing an error between the corrected machine position and the extracted detected position or the extracted estimated position; approximating the re-computed error by a quadratic function of time; and subtracting a position computed using the approximated function from the corrected machine position.

7. The machine motion trajectory measuring device according to claim 1, wherein the motion trajectory measuring unit subjects results of the measurement of the acceleration to interpolation at intervals shorter than a cycle of the measurement and then integrates the interpolated results.

8. The machine motion trajectory measuring device according to claim 1, further comprising a motion trajectory display unit for displaying the motion trajectory of the machine, and wherein
the motion trajectory measuring unit generates a target trajectory using a target position input to a command generation unit, generates a commanded trajectory using the commanded position outputted from the command generation unit, generates a detected portion trajectory from the detected position, and causes the motion trajectory display unit to display the motion trajectory of the machine and at least one of the target trajectory, the commanded trajectory, and the detected portion trajectory in a superposed manner.

9. The machine motion trajectory measuring device according to claim 8, wherein the motion trajectory display unit displays an error in a direction normal to the target trajectory between the target trajectory and each of the commanded trajectory, the detected portion trajectory, and the motion trajectory of the machine in an enlarged manner.

10. The machine motion trajectory measuring device according to claim 8, wherein the motion trajectory display unit displays an error in a direction normal to the target trajectory between the commanded trajectory and the detected portion trajectory, between the commanded trajectory and the motion trajectory of the machine, or between the detected portion trajectory and the motion trajectory of the machine in an enlarged manner.

11. The machine motion trajectory measuring device according to claim 1, further comprising a motion trajectory display unit for displaying the motion trajectory of the machine,
wherein the motion trajectory measuring unit generates a target trajectory using a target position inputted to a command generation unit, generates a commanded trajectory using the commanded position outputted from the command generation unit, generates a detected portion trajectory from the detected position, and causes the motion trajectory display unit to display the motion trajectory of the machine and at least one of the target trajectory, the commanded trajectory, and the detected position trajectory in a superposed manner, and
wherein the motion trajectory of the machine in the motion trajectory error occurring regions is displayed by the motion trajectory display unit.

12. The machine motion trajectory measuring device according to claim 1, wherein the motion trajectory measuring data extracting unit obtains the machine position by: estimating a motion trajectory of the machine using model simulating response characteristics of the position of the machine to the commanded position; setting and extracting regions in which a trajectory error between the estimated motion trajectory and a target trajectory exceeds a preset allowance as motion trajectory error occurring regions in which a trajectory error is expected to occur; and integrating the acceleration in the motion trajectory error occurring regions twice.

13. The machine motion trajectory measuring device according to claim 12, wherein the motion trajectory measuring unit obtains the machine position by: computing the estimated position and an estimated velocity using the model simulating the response characteristics of the position of the machine to the commanded position when the acceleration is integrated in the motion trajectory error occurring regions; computing a machine velocity by integrating the acceleration with the estimated velocity at a first time point in each of the motion trajectory error occurring regions being set as an initial value; and integrating the machine velocity with the estimated position at the first time point in each of the motion trajectory error occurring regions being set as an initial value.

14. The machine motion trajectory measuring device according to claim 12, wherein the motion trajectory measuring unit obtains the machine position by: computing a detected velocity by differentiating the detected position when the acceleration is integrated in the motion trajectory error occurring regions; computing a machine velocity by integrating the acceleration with the detected velocity at a first time point in each of the motion trajectory error occurring regions being set as an initial value; and integrating the machine velocity with the detected position at the first time point in each of the motion trajectory error occurring regions being set as an initial value.

15. The machine motion trajectory measuring device according to claim 12, wherein the motion trajectory measuring unit corrects the machine position by: computing an error between the machine position in each of the motion trajectory error occurring regions and the estimated position or the detected position; approximating the computed error by a quadratic function of time; and subtracting a position computed using the approximated function from the machine position.

16. The machine motion trajectory measuring device according to claim 15, wherein the motion trajectory measuring unit re-corrects the machine position by: computing a rate of change of an error between the commanded position and the detected position or the estimated position when an error between the corrected machine position and the estimated position or the detected position is equal to or more than a preset threshold value; extracting the estimated position or the detected position in a region where the rate of change is equal to or less than a preset threshold value; re-computing an error between the corrected machine position and the extracted detected position or the extracted estimated position; approximating the re-computed error by a quadratic function of time; and subtracting a position computed using the approximated function from the corrected machine position.

17. A numerically controlled machine tool including a machine motion trajectory measuring device for measuring a motion trajectory of a machine position, wherein the machine position is a relative position of a tool of a machine with respect to a work table controlled by a motor, a motor position of the motor being detected by a detector, and the motor is driven such that the detected motor position follows a commanded position, the machine motion trajectory measuring device comprising:
an accelerometer for measuring acceleration of the tool of the machine or the work table; and
a motion trajectory measuring unit which measures the motion trajectory of the machine position by
obtaining the measured acceleration measured by the accelerometer,
determining motion trajectory error occurring regions, in which a trajectory error is expected to occur, based on a rate of change of the acceleration obtained by differentiating the commanded position three times and exceeding a preset threshold value, and a reversal of a sign of a commanded velocity obtained by differentiating the commanded position, extracting the measured acceleration at the motion trajectory error occurring regions, integrating the measured acceleration at the motion trajectory error occurring regions twice to compute the machine position, correcting errors for the computed machine such that a profile of the corrected machine position coincides with a profile of the detected motor position or with a profile of an estimated position estimated using a model for simulating a response of the machine position to the commanded position, and obtaining a trajectory of the corrected machine position as the motion trajectory of the machine position.

\* \* \* \* \*